United States Patent
Hultman et al.

(10) Patent No.: US 8,110,959 B2
(45) Date of Patent: Feb. 7, 2012

(54) METHOD FOR PRODUCING AN ELECTRICAL MACHINE WITH A BODY OF SOFT MAGNETIC MATERIAL

(75) Inventors: Lars Hultman, Viken (SE); Göran Nord, Helsingborg (SE); Mats Alaküla, Kävlinge (SE)

(73) Assignee: Höganäs AB, Höganäs (SE)

( * ) Notice: Subject to any disclaimer, the term of this patent is extended or adjusted under 35 U.S.C. 154(b) by 803 days.

(21) Appl. No.: 11/578,941

(22) PCT Filed: May 4, 2005

(86) PCT No.: PCT/SE2005/000647
§ 371 (c)(1),
(2), (4) Date: Nov. 13, 2006

(87) PCT Pub. No.: WO2005/109603
PCT Pub. Date: Nov. 17, 2005

(65) Prior Publication Data
US 2007/0222306 A1    Sep. 27, 2007

(30) Foreign Application Priority Data
May 11, 2004   (SE) ..................... 0401217

(51) Int. Cl.
 H02K 15/12   (2006.01)
 H02K 15/095  (2006.01)
 H02K 3/34    (2006.01)
(52) U.S. Cl. .............. 310/216.113; 310/216.137; 310/43
(58) Field of Classification Search ............. 310/37, 310/43, 67, 216, 216.113, 216.137; H02K 1/00, H02K 1/04, 3/34, 15/10, 15/095, 15/12
See application file for complete search history.

(56) References Cited

U.S. PATENT DOCUMENTS

| | | | |
|---|---|---|---|
| 3,255,512 A | 6/1966 | Lochner et al. | |
| 3,408,573 A | 10/1968 | Wulkopf et al. | |
| 4,083,917 A | 4/1978 | Hallerback et al. | |
| 4,255,684 A | 3/1981 | Mischler | |
| 4,431,979 A | 2/1984 | Stijntjes et al. | |
| 4,529,900 A * | 7/1985 | Uzuka ............................. | 310/43 |

(Continued)

FOREIGN PATENT DOCUMENTS
CN   1283888 A   2/2001
(Continued)

OTHER PUBLICATIONS

Definition of "resin" from http://dictionary.reference.com/ browse/resin, printed Jul. 23, 2010, which is from The American Heritage® Dictionary of the English Language, Fourth Edition. Houghton Mifflin Company, 2009.*

(Continued)

*Primary Examiner* — Quyen Leung
*Assistant Examiner* — Michael Andrews
(74) *Attorney, Agent, or Firm* — Buchanan Ingersoll & Rooney PC

(57) ABSTRACT

A method for producing a core and a method for producing an electrical machine. Said core has a body of soft magnetic material having a plurality of teeth and at least one magnetic flux cross section area enlarging element being made from a composite of a soft magnetic powder and a binder, said magnetic flux area enlarging element being arranged onto a tooth of said body.

12 Claims, 10 Drawing Sheets

U.S. PATENT DOCUMENTS

| | | | |
|---|---|---|---|
| 4,616,407 A * | 10/1986 | Tamaki et al. | 310/208 |
| 4,651,039 A * | 3/1987 | Yamamoto et al. | 310/45 |
| 6,472,792 B1 | 10/2002 | Jack et al. | |
| 6,492,749 B1 | 12/2002 | Shiga et al. | |
| 6,727,672 B2 * | 4/2004 | Mizumaki | 318/437 |
| 6,825,585 B1 * | 11/2004 | Kalldin et al. | 310/65 |
| 2003/0193260 A1 * | 10/2003 | Reiter et al. | 310/217 |
| 2004/0050180 A1 * | 3/2004 | Abe et al. | 73/862.331 |

FOREIGN PATENT DOCUMENTS

| | | |
|---|---|---|
| EP | 0 248 946 B1 | 6/1991 |
| JP | 60-042710 | 3/1985 |
| JP | 60-059751 | 4/1985 |
| JP | 60187244 A | 9/1985 |
| JP | 60187244 A | 9/1985 |
| JP | 8308187 A | 11/1996 |
| JP | 10-14145 | 1/1998 |
| JP | 10004641 A | 1/1998 |
| JP | 10014145 A * | 1/1998 |
| JP | 10229652 A | 8/1998 |
| JP | 1150894 A | 6/1999 |
| JP | 2003-143814 | 5/2003 |
| JP | 2003-309944 A * | 10/2003 |
| JP | 2003-309994 A | 10/2003 |
| JP | 2003309944 A * | 10/2003 |
| WO | WO 03/075432 A2 | 9/2003 |
| WO | WO-2004008603 | 1/2004 |

OTHER PUBLICATIONS

Machine translation of Shibata (JP2003-309944).*

Machine translation of Sato (JP10-014145).*

English Translation of Japanese Official Action issued Apr. 5, 2010 (mailed Apr. 9, 2010) in Japanese Patent Application No. 2007-513102.

* cited by examiner

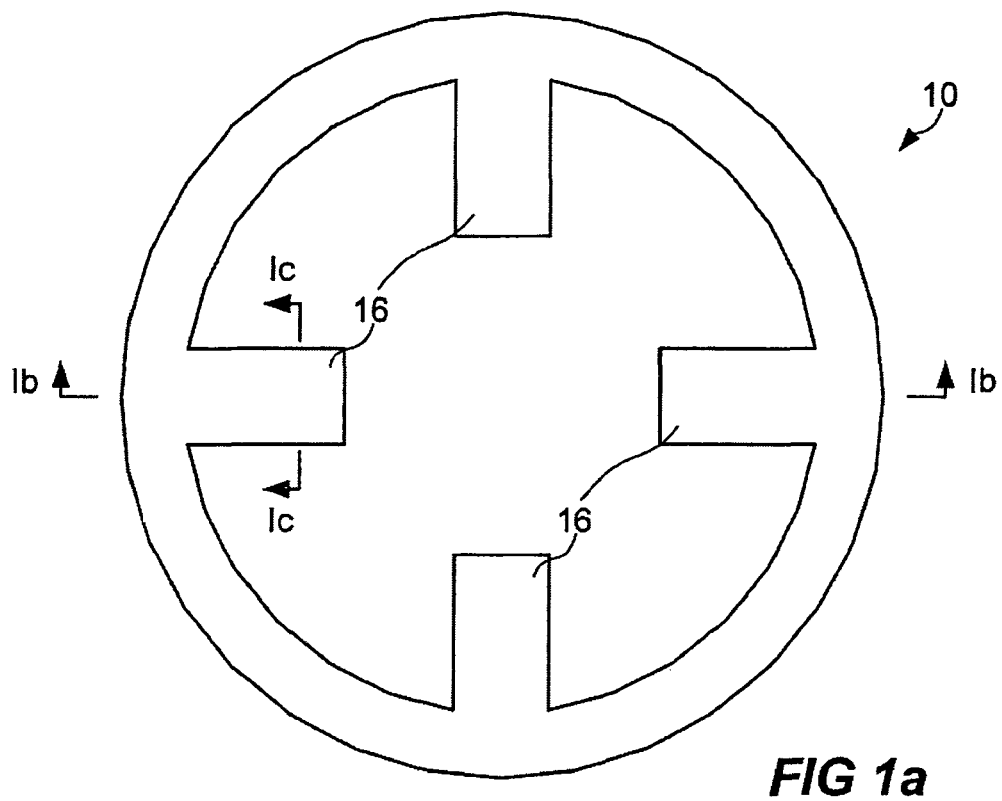
*FIG 1a*
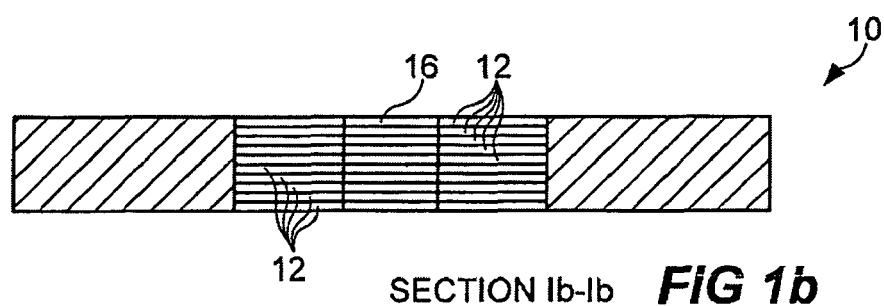
SECTION Ib-Ib  *FIG 1b*
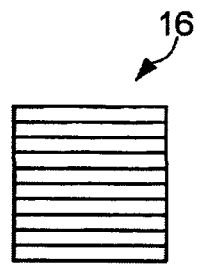
SECTION Ic-Ic  *FIG 1c*

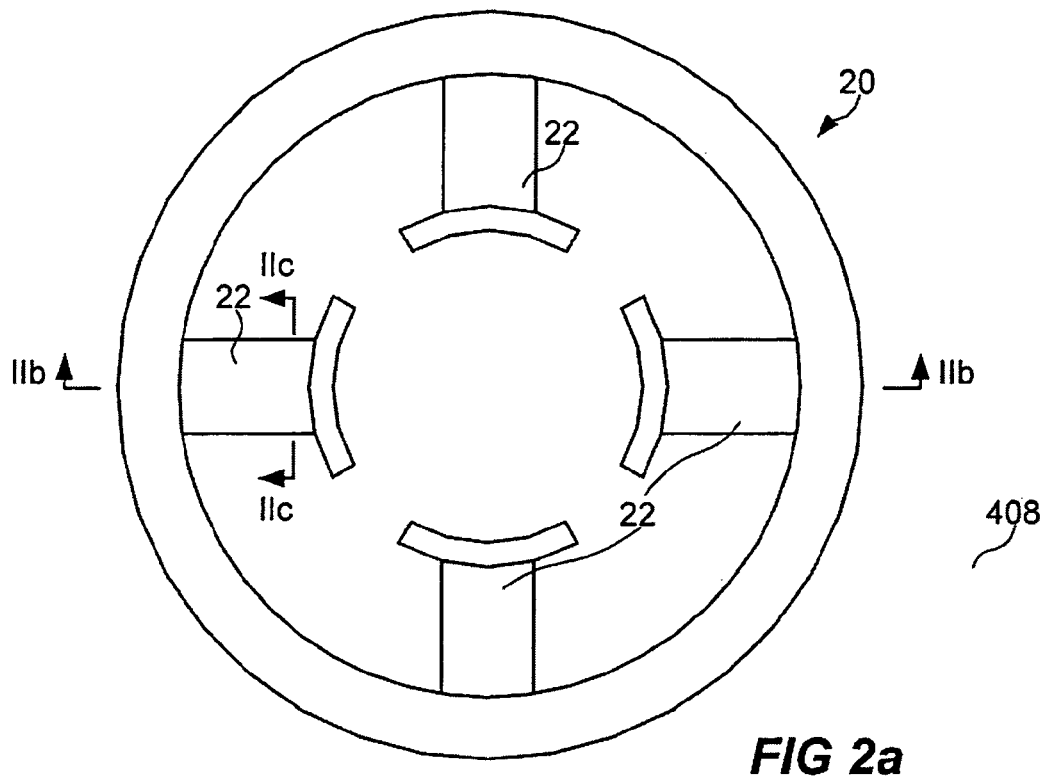
FIG 2a
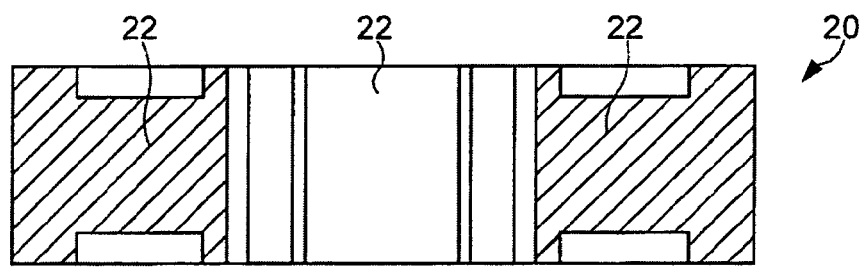
SECTION IIb-IIb FIG 2b
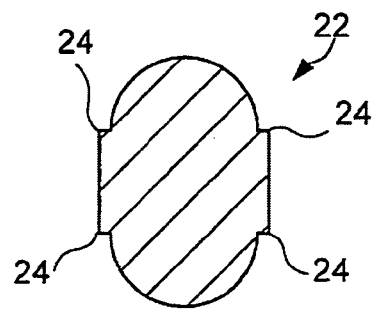
SECTION IIc-IIc FIG 2c

SECTION IIIb-IIIb

SECTION IIIc-IIIc

SECTION IIId-IIId

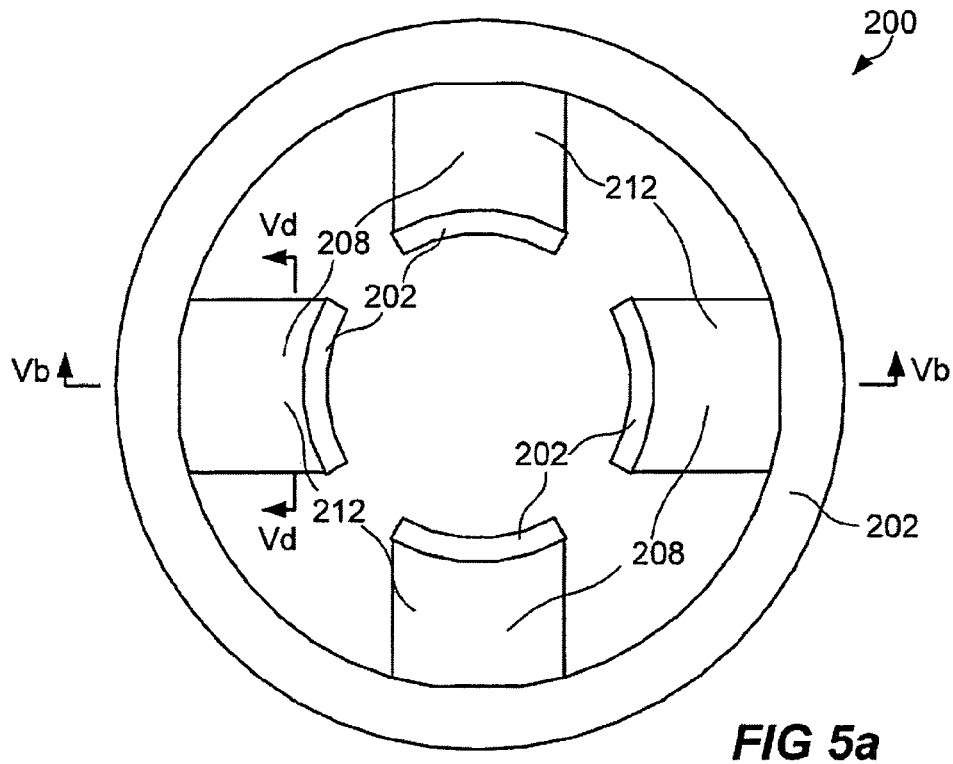
FIG 5a
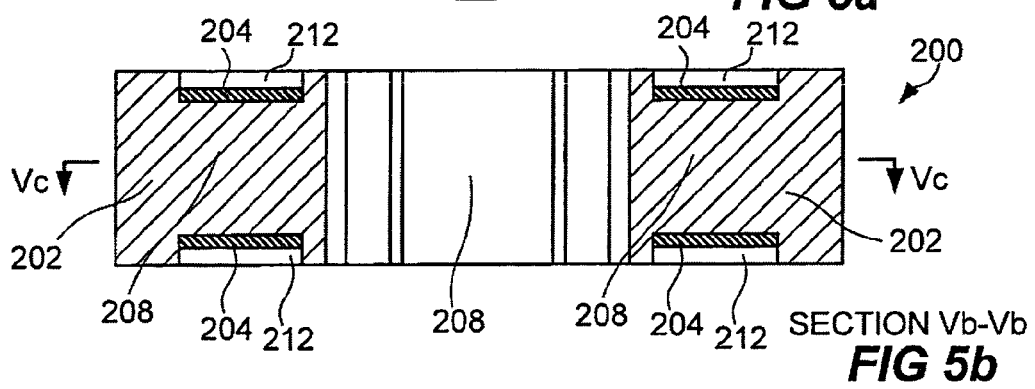
SECTION Vb-Vb
FIG 5b
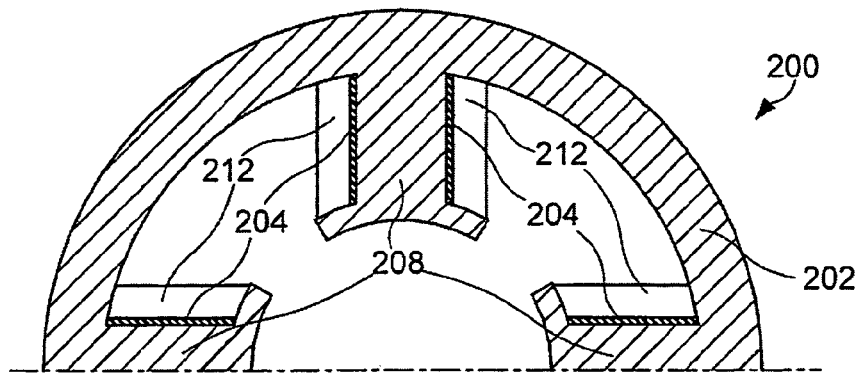
SECTION Vc-Vc  FIG 5c

SECTION Vd-Vd

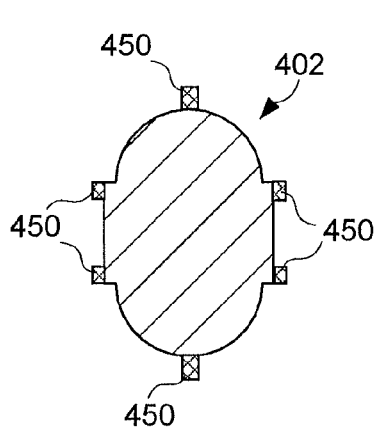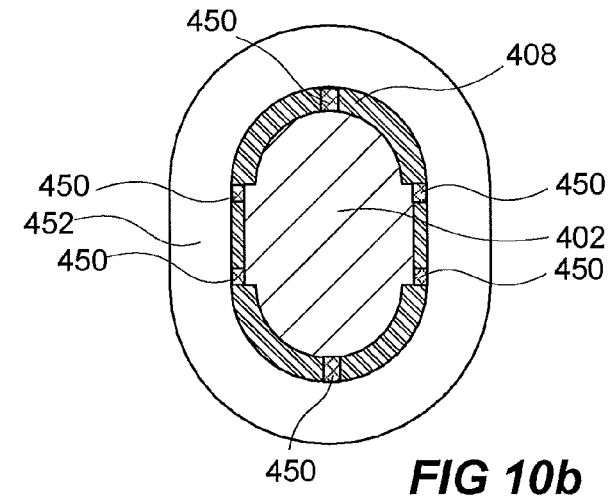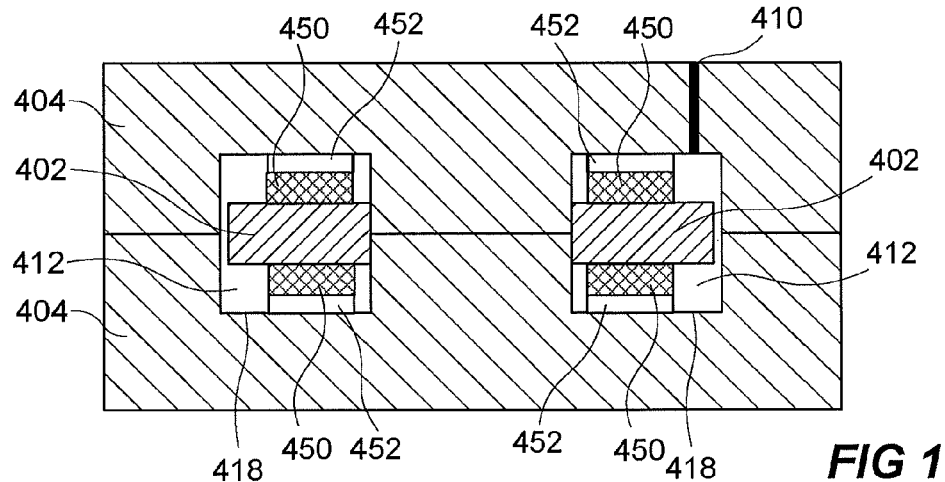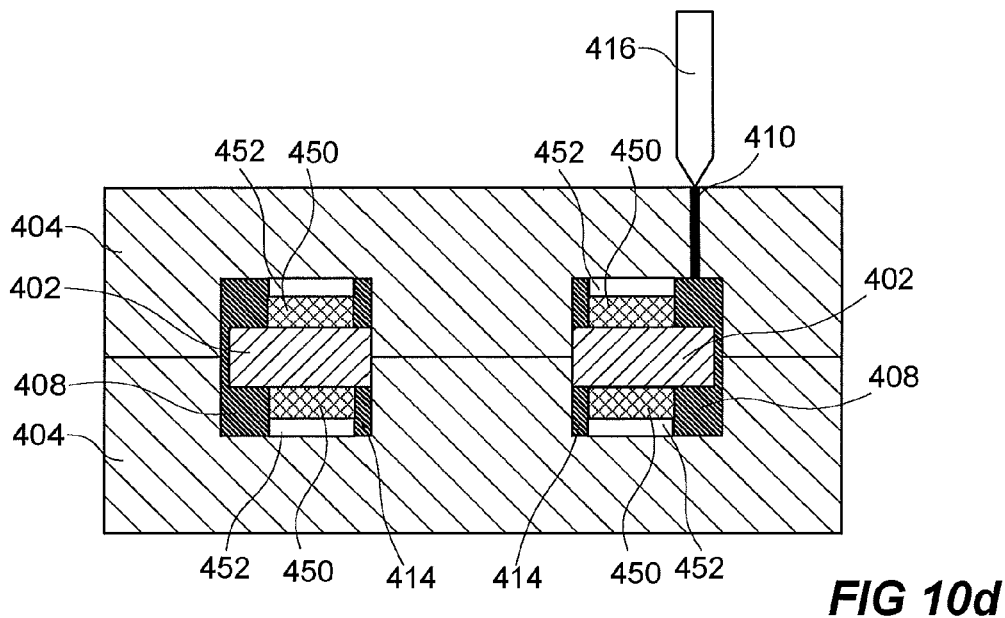

METHOD FOR PRODUCING AN ELECTRICAL MACHINE WITH A BODY OF SOFT MAGNETIC MATERIAL

TECHNICAL FIELD OF THE INVENTION

The present invention relates to a core for an electrical machine, an electrical machine, a method for producing a core for an electrical machine, and a method for producing an electrical machine.

BACKGROUND OF THE INVENTION

Electrical machines of today are mostly provided with cores made from laminated soft magnetic sheets or from soft magnetic powder which is compacted to the desired shape and density of the core and then heat treated. However, it may be difficult to produce a core with an optimal geometry, from a magnetic point of view, or a core with a geometry that varies in three dimensions by using laminated soft magnetic sheets. Even if the use of soft magnetic powder makes it possible to produce a core with a geometry that varies in three dimensions it may sometimes be impossible to produce a core having the optimal geometry. Therefore, it may be difficult to produce electrical machines having high power density, i.e. produced power divided with the volume of the machine, and, thus, the machines equipped with the core may not be quite as efficient as they could be.

SUMMARY OF THE INVENTION

The object of the present invention is to provide a solution to the above mentioned problems.

This is achieved by means of an electrical machine according to claim 1 and a method for producing an electrical machine according to claim 11.

In particular, according to one aspect of the invention, an electrical machine comprises a core, including a body of soft magnetic material, at least one winding arranged around at least a portion of said core, and a magnetic flux cross section area enlarging element substantially filling a space between said at least one winding and at least a portion of said body of the core, the magnetic flux cross section area enlarging element includes a composite of soft magnetic powder and a thermoplastic, the composite being injection molded.

According to another aspect of the invention, a method for producing an electrical machine comprising a body of soft magnetic material, said method comprising the acts of arranging at least one winding around at least a portion of the body of soft magnetic material, positioning the body of soft magnetic material and the at least one winding in a cavity of a mold, and injecting a composite of soft magnetic powder and a thermoplastic into the cavity of the mold.

The above electrical machine and the above method may be advantageous in that they may make volumes of the electrical machine that did not contribute to the generation of power in prior art electrical machines, conduct magnetic flux and, thus, contribute to the generation of power. Accordingly, it may become possible to achieve an electrical machine having increased power density. Further, the magnetic flux area enlarging element is arranged onto said tooth of said body by means of injection molding. This may be advantageous in that it may facilitate arranging of said magnetic flux area enlarging element onto said tooth and in that it may facilitate the filling of non contributing spaces, i.e. volumes of air having very low permeability.

By injection molding the composite as described above may also make it possible to in the same step as forming the magnetic flux cross section enlarging element form and with the same material form functional features. The effect of this is that the production may be facilitated or sped up.

A further scope of applicability of the present invention will become apparent from the detailed description given below. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other features and advantages of the present invention will become apparent from the following detailed description of a presently preferred embodiment, with reference to the accompanying drawings, in which FIG. 1a shows a schematic top view of a prior art stator core of laminated sheets of soft magnetic material, FIG. 1b shows a schematic view of a section of the stator core of FIG. 1a, FIG. 1c shows a schematic view of a section of a tooth of the stator core of FIG. 1a, FIG. 2a shows a schematic top view of a prior art stator core made from soft magnetic powder, FIG. 2b shows a schematic view of a section of the stator core of to FIG. 2a, FIG. 2c shows a schematic view of a section of a tooth of the stator core of FIG. 2a, FIG. 3a shows a schematic top view of a stator core according to one embodiment of the invention, the core is provided with windings, FIG. 9b shows a schematic perspective view of a cross section of the core of FIG. 9a.

FIG. 10a shows a schematic view of a tooth of a stator core provided with spacers and before injection molding.

FIG. 10b shows a schematic view of the tooth of FIG. 10a after being provided with a winding and being injection molded.

FIG. 10c shows a schematic cross section view of a mold in which a core equipped with teeth according to FIG. 10a is arranged and in which the windings has been applied to the teeth before injection molding.

FIG. 10d shows the schematic cross section view of FIG. 10c after injection molding.

DETAILED DESCRIPTION OF EMBODIMENTS

Figure 3A:
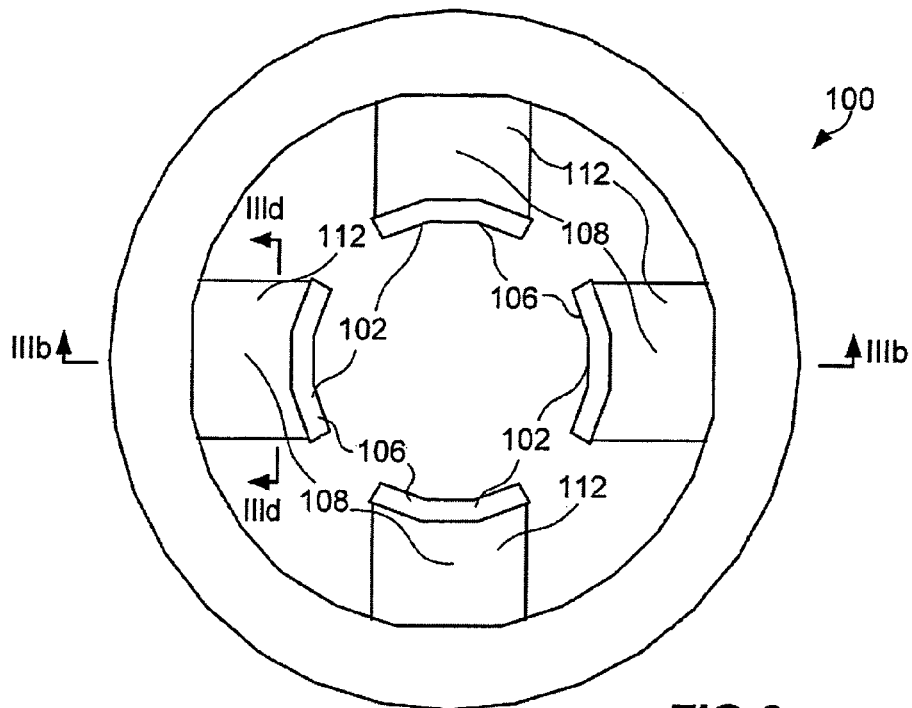
FIG. 3b shows a schematic view of a section of the stator core of FIG. 3a, FIG. 3c shows a schematic view of a section of the section of FIG. 3b.
FIG. 3d shows a schematic view of a section of a tooth of the stator core of FIG. 3a, FIG. 3e shows a schematic perspective view of the stator core of FIG. 3a provided with windings.
FIG. 3f shows a schematic perspective view of the section of FIG. 3b provided with windings.
Figure 3B:
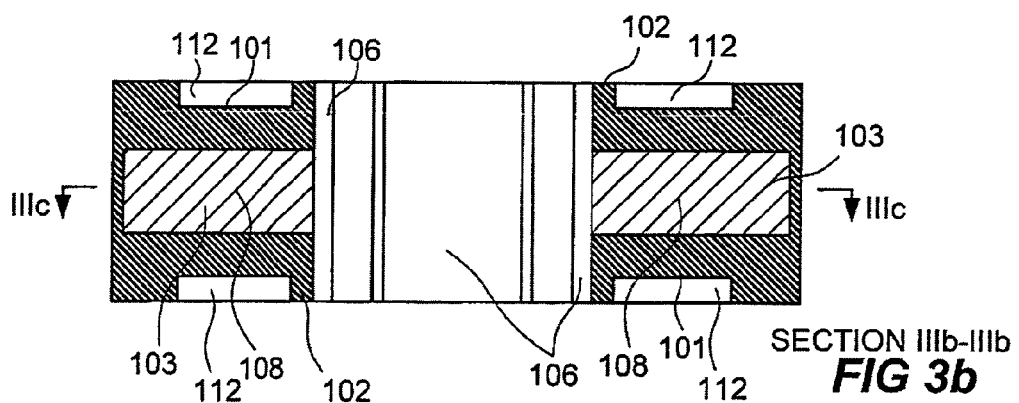
Figure 3C:
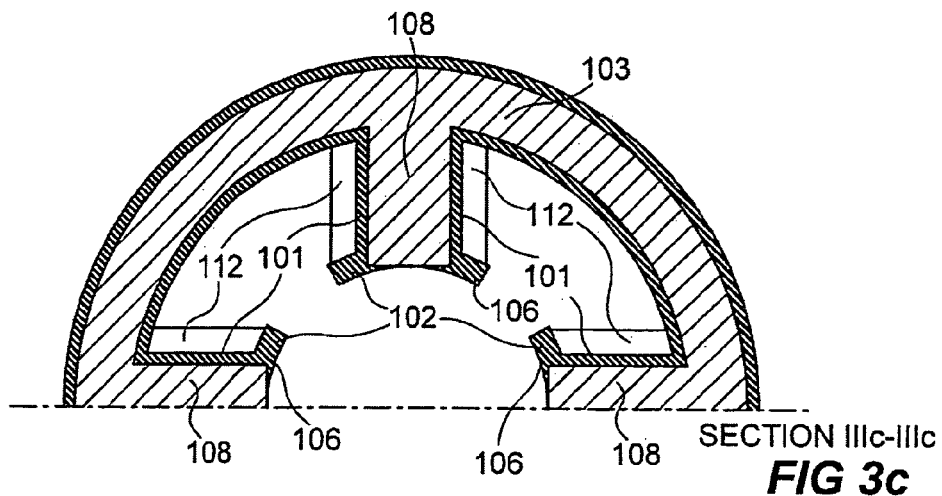
Figure 3D:
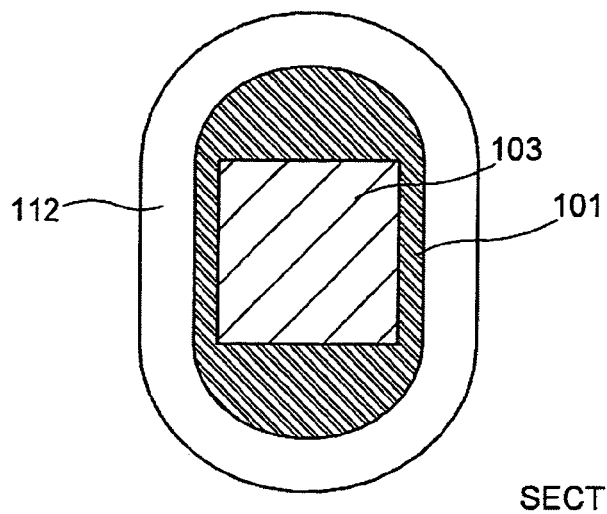
Figure 3E:
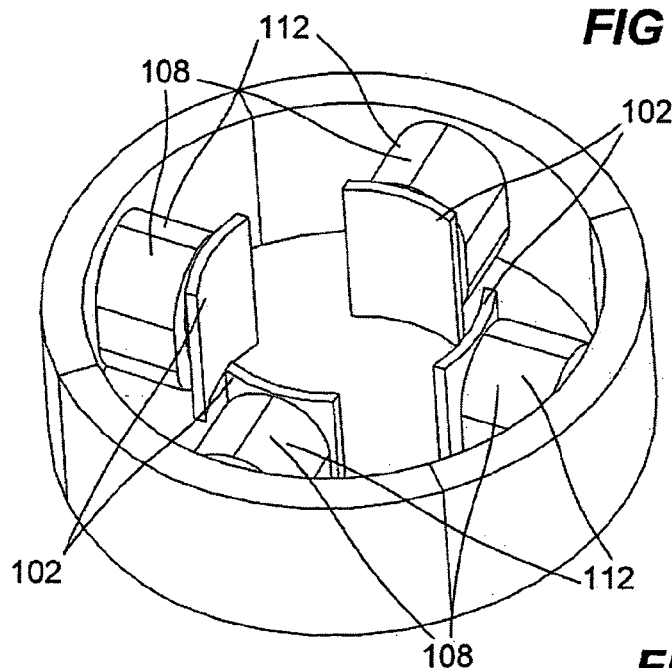
Figure 3F:
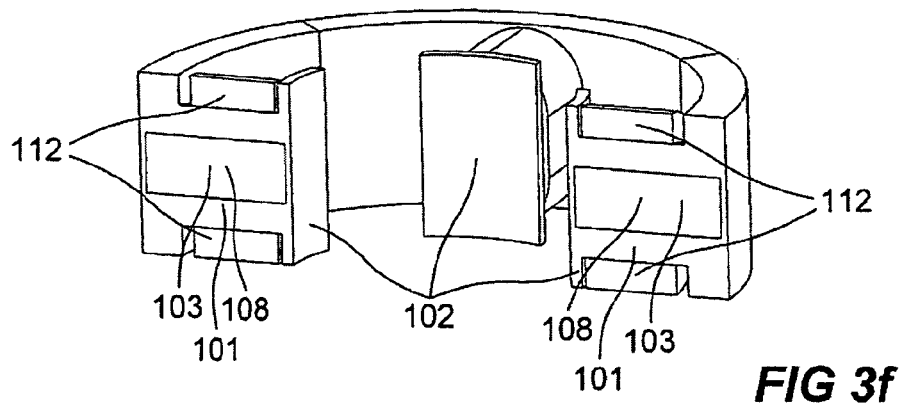

In FIGS. 1a-c a prior art laminated stator core 10 having teeth 16 is shown. As seen in the figure the person constructing a core by using laminated soft magnetic sheets 12 is limited by the layered structure of the sheets 12 and may not freely and easily vary the shape in three dimensions. The skilled person is familiar with the manufacturing of laminated cores.

In FIGS. 2a-c a prior art stator 20 core made from soft magnetic powder is shown. In some cases it may be difficult to completely achieve the desired shape of the core, because of limitations relating to the tools used to compact the soft magnetic powder into the desired design. According to the example of FIGS. 2a-c the stator core includes teeth 22 and the limitation of the tools used to compact the soft magnetic powder results in a geometrical discontinuity 24 in the teeth 22, seen in FIG. 2c. The result presented in FIGS. 2a-c only shows an example, a limitation of the tools may result in other disadvantageous shapes. Such discontinuities 24 or disadvantageous shapes are seldom desired. Some geometries and shapes of cores or teeth 22 are difficult to produce without generating discontinuities 24 like the ones showed in FIG. 2c. The discontinuities 24 have the effect that a lesser cross sectional area of the teeth is able to lead magnetic flux in relation to a corresponding tooth without discontinuities 24. This may result in a less effective stator/rotor and machine, in relation to a stator not having such discontinuities and, thus, in relation to a machine including a stator not having such discontinuities. Another or additional effect may be that the power density becomes lower than the power density of a corresponding machine in which the core does not have such discontinuities. The power density is defined as produced power divided with volume of the machine. The skilled person is familiar with the production of cores from soft magnetic powder.

Below the invention will be described in relation to a stator core of an electrical motor or an electrical generator. However, it is obvious for the skilled person to apply these teachings on any type of core, e.g. a stator core, a rotor core, a moving core of a linear motor, stator core of a linear motor, etc., and any electrical machine, e.g. rotary motor, rotary generator, linear motor, linear generator, etc.

In FIGS. 3a-f a stator core 100 according to one embodiment of the invention is shown. A magnetic flux cross section area enlarging element 101, 102 is arranged onto a laminated stator body 103. The body might be a prior art laminated stator core as described in connection with FIGS. 1a-c or a roughly shaped laminated body, resembling the shape of the final core, acting as a basic structure from which the core is evolved. The magnetic flux cross section area enlarging element 101, 102 is made of a composite of a soft magnetic powder and a binder, as will be described below. The composite may be injection molded onto the stator body 103, as will be described below as well. The permeability of the composite of the magnetic flux cross section enlarging element 101, 102 is greater than the permeability of air and the core with the magnetic flux cross section area enlarging element 101, 102 form a larger cross sectional area, in respect of the direction of the magnetic flux when the electrical machine is running, than without the magnetic flux cross section area enlarging element 101, 102. Accordingly, areas or volumes in the path for the magnetic flux which in the prior art only included air, i.e. low permeability, now may contribute to the permeance of the core and thereby enable an electrical machine having greater power density. Further, the magnetic flux cross section area enlarging element 102 may be used to produce more efficient cores by modeling the shape of specific portions of the core into more efficient shapes, e.g. the shape of a tip 106 of the teeth 108 as clearly shown in FIGS. 2b-c. The shape of the tip 106 of the teeth 108 in FIGS. 2b-c improves the magnetic interaction between a stator and a rotor in relation to the small square shaped tip of the stator shown in FIGS. 1b-c in that it provides a greater magnetic flux cross section area for the magnetic interaction. Additionally, the magnetic flux cross section area enlarging element may increase the heat transfer from the windings of a core by providing a thermal transfer path. This may be achieved if the compound of the magnetic flux cross section area element 101 is selected so that it is conducting heat better than air. The magnetic flux cross section area enlarging element 101 may also provide an increased heat conducting surface being in contact with the winding, in relation to the smaller contact areas of the prior art cores.

The windings 112 may be provided around the teeth of the final core as in the FIGS. 3a-f, i.e. after the magnetic flux cross section area enlarging element 101 has been arranged onto the stator body 103, or before the application of the magnetic flux cross section area enlarging element 101. By providing the composite to the core and windings, i.e. after the windings have been arranged on the core, the cross section area of the magnetic flux cross section area enlarging element may fill additional potential spaces of low permeability and the heat transfer may be further enhanced.

Figure 4A:
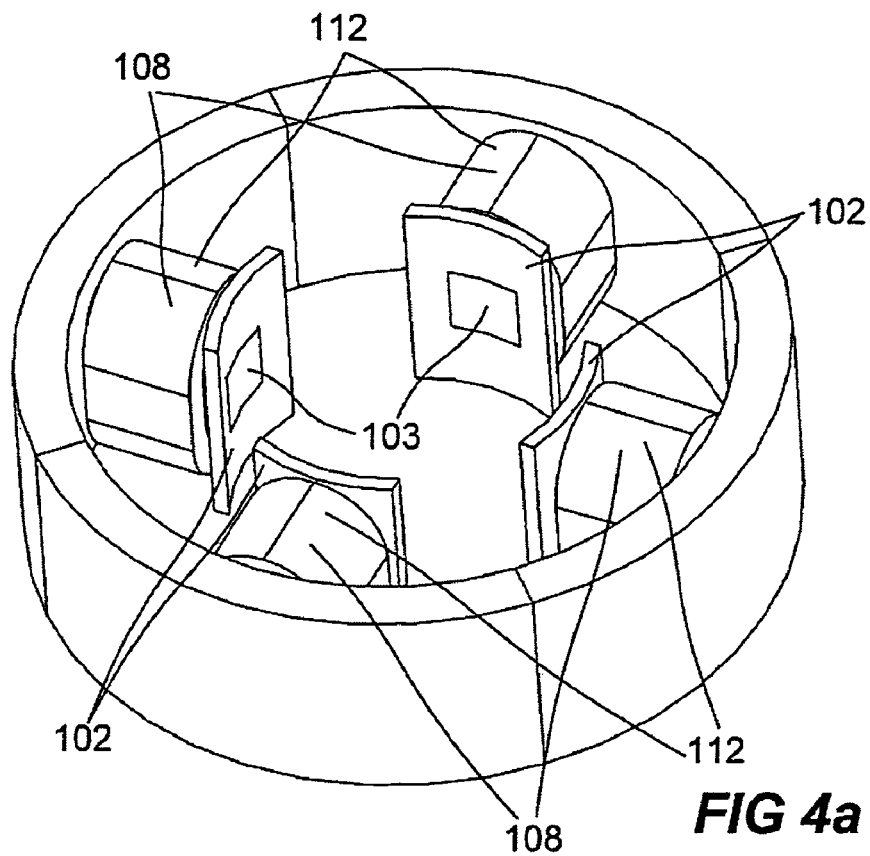
FIG. 4a shows a schematic perspective view of a core, provided with a winding, according to another embodiment.
Figure 4B:
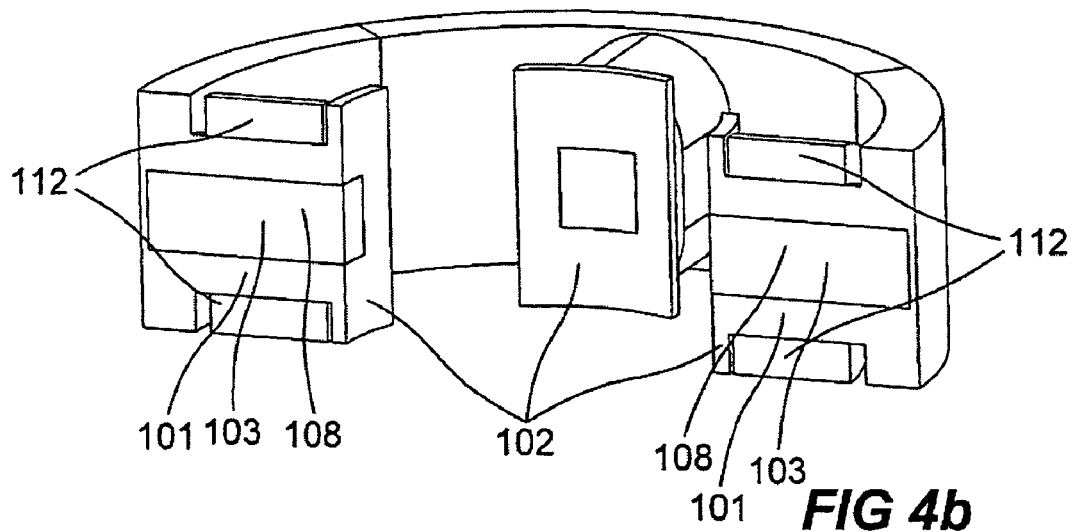
FIG. 4b shows a schematic perspective view of a section of the core of FIG. 4a, FIG. 5a shows a schematic top view of a stator core according to yet another embodiment of the invention, the core is provided with windings.
Figure 5D:
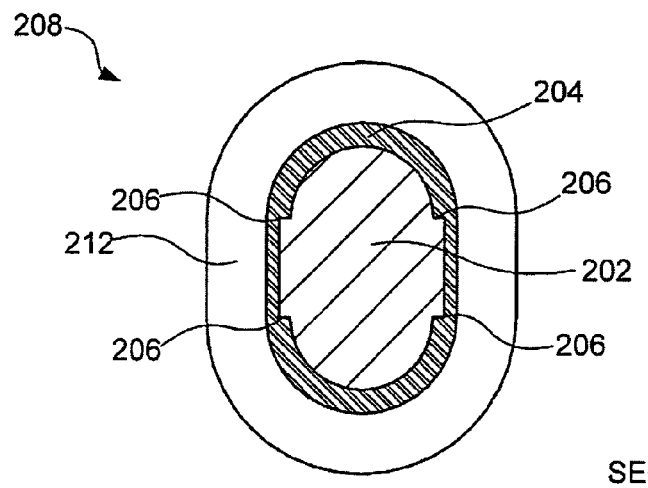
FIG. 5d shows a schematic view of a section of a tooth of the stator core of FIG. 5a, FIG. 5e shows a schematic perspective view of the stator core of FIG. 5a, FIG. 5f shows a schematic perspective view of the section of FIG. 5b.
Figure 5E:
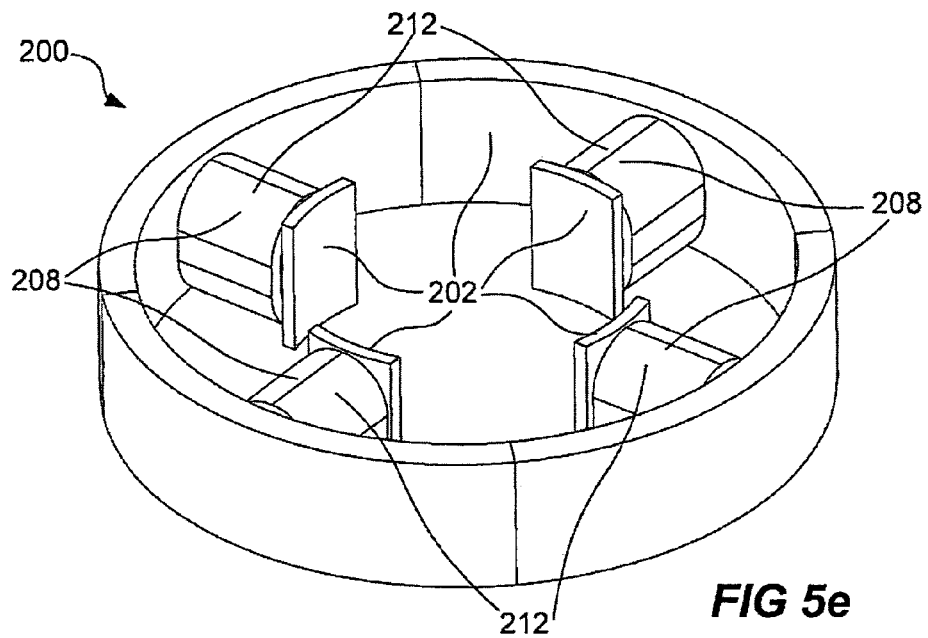
FIG. 5b shows a schematic view of a section of the stator core of FIG. 5a, FIG. 5c shows a schematic view of a section of the section of FIG. 5b.
Figure 5F:
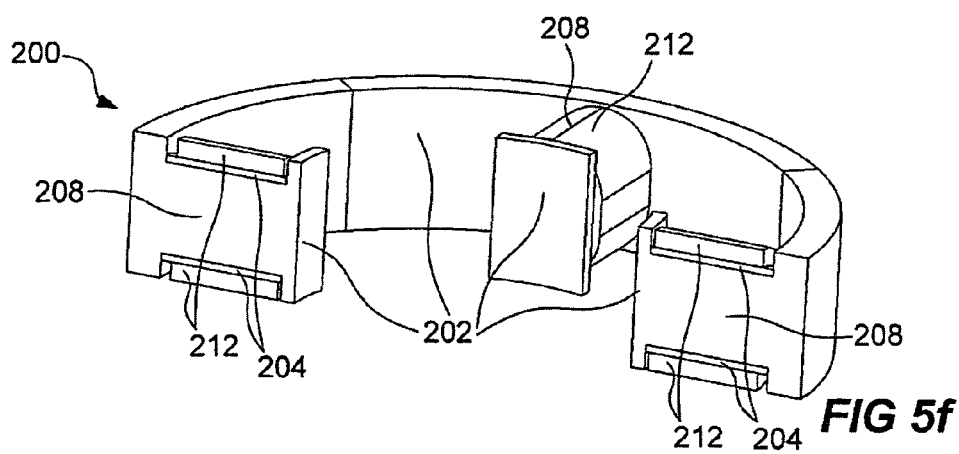

In FIGS. 4a-b shows an embodiment that differs from the embodiment of FIGS. 3a-f in that it exposes the body 103 at the tip 106 of the teeth 108. This is achieved by not covering the end surface 120 of the portions of the body with the composite of soft magnetic powder and resin, said portions being the basic structure of the teeth 108.

In FIGS. 5a-f shows another embodiment of the core 200, in which the core 200 is based on a body 202 made of soft magnetic powder. The body 202 might be a prior art stator core made from soft magnetic powder as described in connection with FIGS. 2a-c or a roughly shaped body of soft magnetic powder resembling the shape of the final core and acting as a basic structure from which the core 200 is evolved. In addition to arranging magnetic flux cross section area enlarging elements 204 as described in connection with FIG. 2c the magnetic flux cross section area enlarging elements 204 may be used to fill discontinuities 206 in the body or in a core and, thus, increase the cross sectional area of the magnetic flux path in a core having discontinuities 206 and consequently increase the permeance of the sections including the magnetic flux cross section area enlarging elements 204. Additionally, in this way the discontinuities 206 of a body or core may be filled, resulting in a continuous surface at the location of the undesired discontinuity. In the embodiment of FIGS. 5a-f the discontinuities 206 are located in the teeth 208, showed in FIG. 5d, and are efficiently filled by the magnetic flux cross section area enlarging elements 204. The advantage of increased heat transfer discussed in connection with FIGS. 3a-f may also be applicable to this embodiment.

In some applications it may be advantageous to provide a core of compacted soft magnetic powder with three dimensional features made from the composite of soft magnetic powder and a binder as described above, even if it may be possible to produce such three dimensional features from compacting soft magnetic powder. The three dimensional feature may for example be a tooth tip of the teeth 208.

The windings 212 may be provided around the teeth 208 of the final core as in the FIGS. 5a-f or before the application of the magnetic flux cross section area enlarging element 204.

According to one embodiment the composite used for the magnetic flux cross section area enlarging elements includes soft magnetic powder and a binder. The amount and properties of the soft magnetic powder and the binder are to be selected so that the permeability of the composite are at least greater than the permeability of air ($\mu_0$) and so that the structural strength required by the specific application in which the core is to be used is achieved. In some applications it may be advantageous to select the amount and properties of the soft magnetic powder and the binder so that the composite is possible to injection mold. The advantages of injection molding may be that it becomes possible to make complicated and close toleranced 3D-structures, that it becomes possible to effective utilize the volume of the electrical machine by reconfigure volumes not conducting magnetic flux to volumes conducting magnetic flux, that the injection molded features are mechanically robust without the need of any complementary work.

It is desired to get as high permeability as possible, however, the requirement of structural strength and the requirement regarding the composite being possible to injection mold may limit the permeability.

The amount of binder used is determined by the amount required to achieve the required structural strength of the core in a specific application and/or required to make it possible to injection mold. The relation between soft magnetic powder and thermoplastic binder for a composite, that may be used for induction molding, may be approximately 83-95 percentage by weight (w.p.) soft magnetic powder and approximately 5-17 w.p. thermoplastic. In one embodiment approximately 90-95 w.p. soft magnetic powder is preferred in order to optimize the magnetic performance of the composite.

The soft magnetic powder may for example be a powder including particles of iron, nickel, cobalt, or any combination of these materials. Also, it may be a powder of a cobalt-iron alloy, a cobalt-nickel alloy, a nickel-iron alloy, or a cobalt-nickel-iron alloy. The particles may be essentially spherical, irregular, or in the shape of flakes. Further, the particles may be coated or non-coated. The composite may be used as electric insulation even if non coated particles are used.

The binder may be a thermoplastic material or a thermosetting material. Thermoplastic material may be advantageous when the price of the core is important or when the material of the core are to be recyclable, the latter is possible by heating the core and allowing the thermoplastic to be drained away. Thermosetting material may be advantageous when the strength of the component is important.

Many representatives of the respective groups are known. From the group of thermoplastic materials one or a combination of the following materials may be selected: Polyamides, Sulfur Containing Polymers, e.g. PPS, etc., for further thermoplastic materials see J. F. Carley, Whittington's Dictionary of Plastics 3:d Ed, ISBN 1-56676-090-9, 1993. From the group of thermosetting materials epoxy resin may be selected, for further thermoplastic materials to select see S. H. Goodman, Handbook of Thermoset Plastics 2:nd Ed., ISBN 0-8155-1421-2, 1998.

Figure 6:
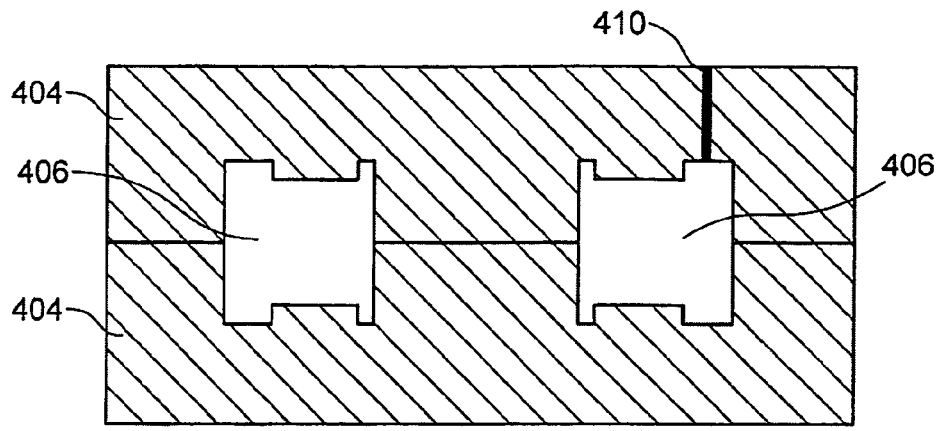
FIG. 6 shows a schematic cross section of a mold.
Figure 7:
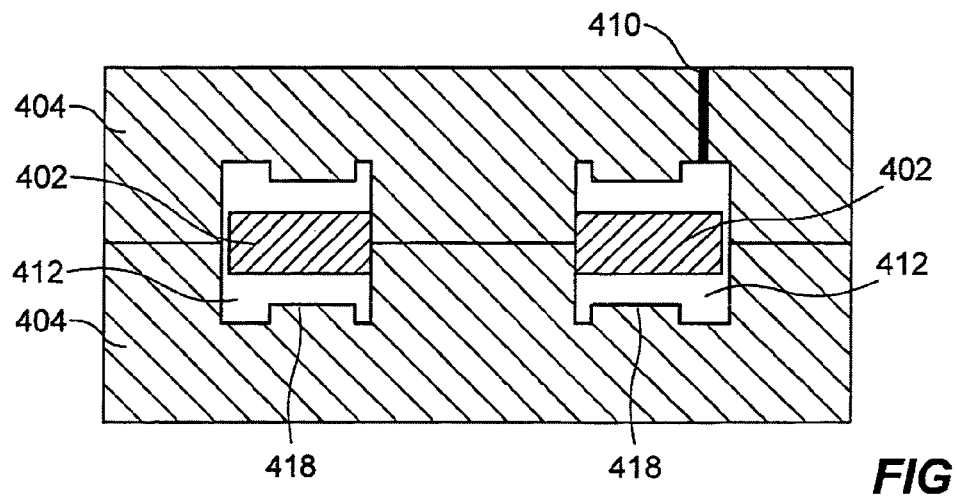
FIG. 7 shows a schematic cross section of the mold of FIG. 6 when a body is positioned in the mold.
Figure 8:
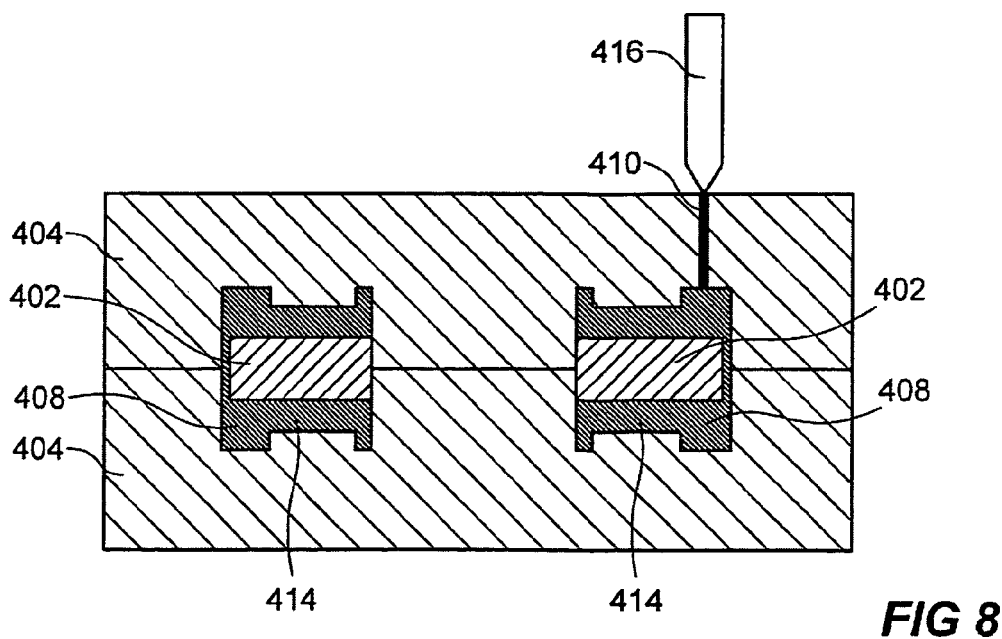
FIG. 8 shows a schematic cross section of the mold and body of FIG. 7 when the composite has been injected into the mold.

In FIGS. 6-8 steps of a process for producing a core according to one embodiment of the invention is presented. Initially, a body 402 is produced or provided. The body 402 may be seen as a semi-finished core or as a core which might be improved by means of applying the invention. Accordingly, as mentioned above, the body 402 might be a known laminated core, e.g. as described in connection with FIGS. 1a-c, a known core made of soft magnetic powder, e.g. as described in connection with FIGS. 2a-c, or a roughly shaped body, of either laminated soft magnetic sheets or soft magnetic powder, resembling the shape of the final core. Said roughly shaped body is then acting as a basic structure from which the core is evolved. Further, a mold 404 is produced or provided. The mold is provided with a cavity 406 for receiving the body 402 and the composite 408 to be arranged onto the body and with one or a plurality of inlets 410 for input of the composite 408 to the cavity 406 during the injection molding, see FIG. 6. Then the body 402 is positioned in the mold, see FIG. 7. The mold is designed to accommodate the body 402 and leave a cavity 412 at the positions where magnetic flux cross section area enlarging elements 414 are to be arranged onto the body 402. When the body 402 is in position in the mold the composite 408 is injected into the mold via an injection conduit 416 and fills the cavities 412 between the body 402 and the walls 418 of the mold 404, see FIG. 8. In this embodiment it may be possible to arrange magnetic flux cross section area enlarging elements at positions on the core which windings or coils are to be wound around and, thus, making the magnetic flux cross section area enlarging elements function as electrical insulation between the body and the windings or coils in addition to the functionality of the magnetic flux cross section area enlarging elements presented above.

According to one embodiment the body 402 may be provided with windings or coils before it is inserted into the mold 404. When the composite 408 is injected into the mold 404 the composite 408 fills not only the cavities 412 between the body 402 and the walls 418 of the mold 404, but also cavities 424 between the winding and the body 402 and the winding and the walls 418 of the mold 404. The advantages of this are, in addition to increasing the magnetic flux cross section area, that the thermal conduction from the winding may be further improved.

In yet another embodiment, see FIGS. 10-d, in which the winding 452 or coils 452 also are provided to the body 402 before the body 402 is inserted into the mold 404, the body 402 may be provided with spacers 450 between the body 402 and the windings 452 or coils 452, thus, providing a cavity 412 between the body 402 and the entire winding 452. The advantage of this embodiment is that it may combine the advantages of the two previously mentioned embodiments. For example, it may make the magnetic flux cross section area enlarging element 408 function as electrical insulation between the body 402 and the winding 452 or coil 452, it may increase the magnetic flux cross section area, and it may improve the thermal conduction from the winding 452.

Figure 9A:
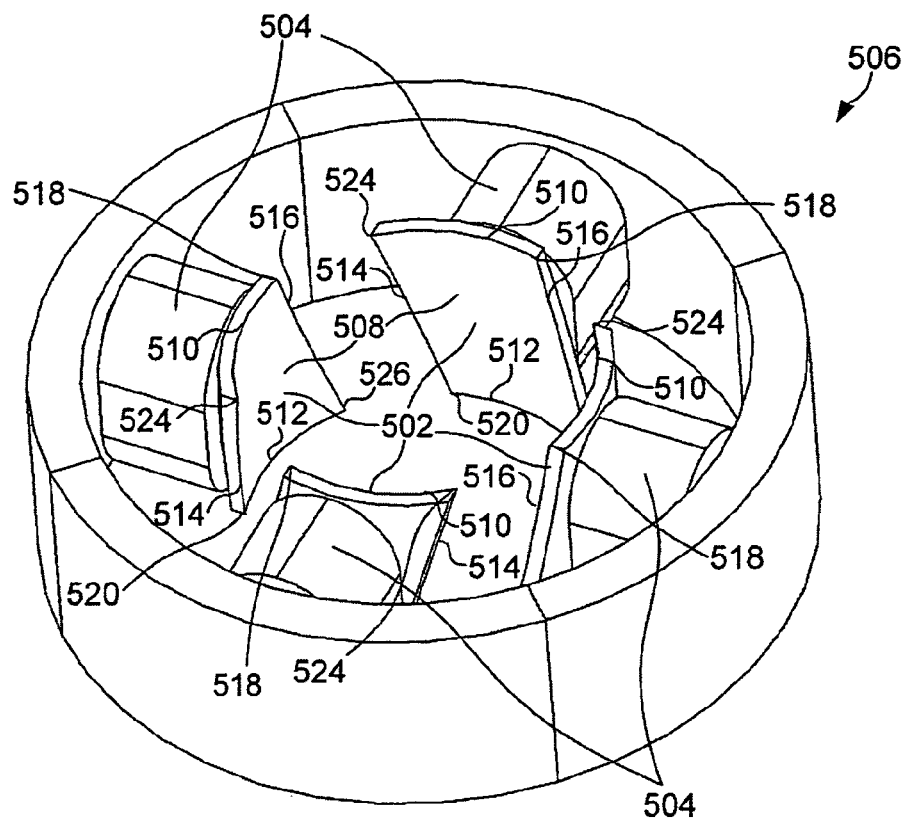
FIG. 9a shows a schematic perspective view of a core according to the invention wherein three dimensional protrusions are molded according to the invention in a particular shape for providing skew.
Figure 9B:
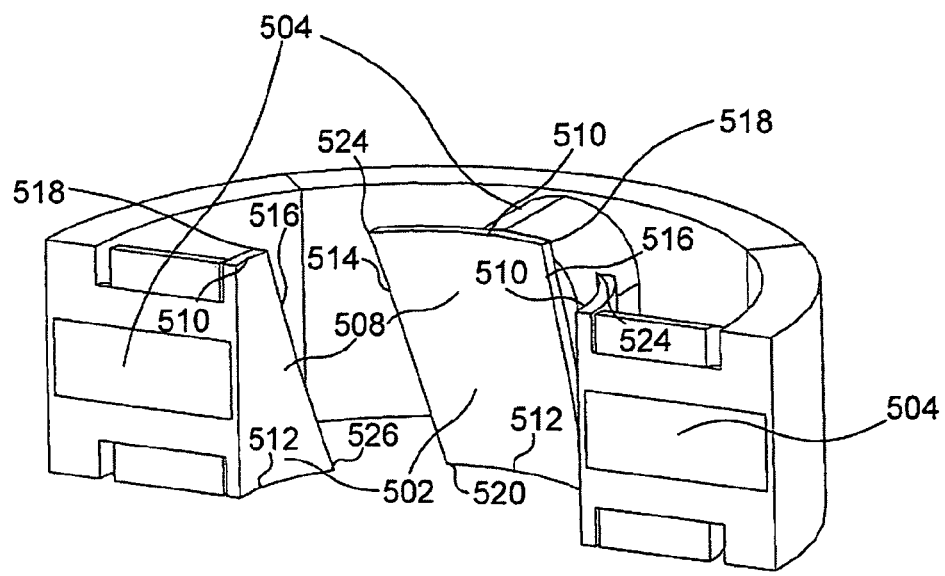

According to another embodiment injection molding of three dimensional features makes it possible to design the free end 502 of the teeth 504 of a core 506 as shown in FIG. 9. The free end 502 of the teeth 504 are provided with an interaction surface 508, for magnetically interaction with a stator or rotor/mover depending on whether the teeth 504 are arranged on a rotor/mover or a stator. The interaction surface 508 is defined by two circumferentially directed edges 510, 512 and two edges 514, 516 that essentially extends axially. However, the essentially axial edges 514, 516 are arranged so that one end 518, 520 of the axial edge 514,516 is arranged closer to the main body of the tooth 504 than the other edge 524, 526 of the same axial edge 514, 516, while all the four edges 510, 512, 514, 516 are arranged at an essentially equal distance from the geometric axis of the core 506. By designing the interaction surface 508 in this way skew may be achieved. Accordingly, the presence of force ripple in a linear motor provided with this core design may be decreased.

According to yet another embodiment the three dimensional extensions and/or magnetic flux cross section area enlarging elements made of said composite and injection molded onto a core, in accordance with any previously mentioned embodiments, may be extended and shaped to perform application specific functions in addition to the ordinary functions of the core.

For instance, the three dimensional extensions and/or magnetic flux cross section area enlarging elements may be extended into features for engaging with systems external to the electrical machine and be molded simultaneously using the same composite as the three dimensional extensions and/or magnetic flux cross section area enlarging elements. Accordingly, the extended feature is produced in the same step and in the same mold as the core, with or without windings. Application specific extensions and shapes that may be produced in this way may for instance be fan blades of a fan, moving details of pumps, gear wheel extensions, bearing seats, maybe integrate bearings and similar application specific features of other machines. Thus, it is possible to incorporate application specific features in the moving part of the electrical machine in a very simple and cost effective way.

According to a further embodiment a wave winding may be arranged at the teeth of the body of a core before the core is finalized by injection molding the magnetic flux area cross section enlarging elements and/or three dimensional features. This, simplifies the production of electrical machines including wave windings and three dimensional features.

The invention claimed is:

1. A method far producing an electrical machine comprising a body of soft magnetic material, said method comprising the steps of:
    arranging at least one winding around at least a portion of the body of soft magnetic material such that a cavity is formed between the at least one winding and said portion of the body of soft magnetic material around which portion the winding is arranged,
    positioning the body of soft magnetic material and the at least one winding in a cavity of a mold, and
    injecting a composite of soft magnetic powder and a thermoplastic into the cavity of the mold and into the cavity between the at least one winding and said portion of the body of soft magnetic material around which portion the winding is arranged in order to form a magnetic flux cross section enlarging element that increases the cross sectional area of the magnetic flux path of the body of soft magnetic material.

2. A method according to claim 1, wherein the body of soft magnetic material includes a plurality of teeth and a plurality of windings and wherein the act of arranging includes arranging each of the windings of a plurality of windings around different teeth.

3. Method according to claim 2, wherein said body of soft magnetic material is made of a stack of sheets of soft magnetic material, said sheets being electrically insulated from each other.

4. Method according to claim 1, wherein said body of soft magnetic material is made of a stack of sheets of soft magnetic material, said sheets being electrically insulated from each other.

5. Method according to claim 1, wherein said body of soft magnetic material is made of compacted soft magnetic powder.

6. Method according to claim 1, wherein said body of soft magnetic material is made of sintered soft magnetic powder.

7. Method according to claim 1, further comprising the step of forming the cavity of the mold for receiving the body of soft magnetic material and the at least one winding and for defining a magnetic flux cross section area enlarging element.

8. Method according to claim 7, wherein the act of forming the cavity of the mold further includes the act of forming the cavity for defining a three dimensional feature extending from the body and the at least one winding.

9. Method according to claim 7, wherein the step of forming the cavity of the mold further includes the step of forming the cavity for defining a three dimensional feature for engaging with systems external to the electrical machine.

10. Method according to claim 1, wherein the magnetic flux cross section enlarging element increases the permeance of a section of the electrical machine comprising the magnetic flux cross section enlarging element.

11. Method according to claim 1, wherein the magnetic flux cross section enlarging element increases heat transfer from the at least one winding to the portion of the body of soft magnetic material around which portion the winding is arranged.

12. Method according to claim 1, wherein the magnetic flux cross section enlarging element extends along the tooth for the entire width of the at least one winding.

* * * * *